United States Patent
Patel et al.

(10) Patent No.: US 10,065,111 B1
(45) Date of Patent: Sep. 4, 2018

(54) MAPPING USER INTERACTIONS WITH A CONTROLLER TO A HAND POSITION

(71) Applicant: Oculus VR, LLC, Menlo Park, CA (US)

(72) Inventors: Nirav Rajendra Patel, San Francisco, CA (US); Palmer Freeman Luckey, Long Beach, CA (US); Julian Hammerstein, Santa Ana, CA (US); Chris Dycus, Costa Mesa, CA (US); Jason Higgins, Seattle, WA (US); David Maurice Moore, Redmond, WA (US)

(73) Assignee: Oculus VR, LLC, Menlo Park, CA (US)

( * ) Notice: Subject to any disclaimer, the term of this patent is extended or adjusted under 35 U.S.C. 154(b) by 60 days.

(21) Appl. No.: 14/971,038

(22) Filed: Dec. 16, 2015

Related U.S. Application Data (60) Provisional application No. 62/092,719, filed on Dec. 16, 2014.

(51) Int. Cl.
| G09G 5/00 | (2006.01) |
| A63F 13/24 | (2014.01) |
| A63F 13/211 | (2014.01) |
| G06F 3/01 | (2006.01) |

(52) U.S. Cl.
CPC ............ *A63F 13/24* (2014.09); *A63F 13/211* (2014.09); *G06F 3/01* (2013.01)

(58) Field of Classification Search
CPC ............ A63F 13/24; A63F 13/211; G06F 3/01
See application file for complete search history.

(56) References Cited

U.S. PATENT DOCUMENTS

| 2007/0046633 | A1* | 3/2007 | Hirshberg | A63F 13/06 345/168 |
| 2010/0245239 | A1* | 9/2010 | Sternberg | A63F 13/06 345/156 |
| 2011/0118025 | A1* | 5/2011 | Lukas | G06F 21/32 463/37 |
| 2011/0118026 | A1* | 5/2011 | Lukas | G06F 3/0383 463/37 |
| 2013/0252736 | A1* | 9/2013 | Akifusa | A63F 13/06 463/37 |

* cited by examiner

*Primary Examiner* — Srilakshmi K Kumar
*Assistant Examiner* — Brent D Castiaux
(74) *Attorney, Agent, or Firm* — Fenwick & West LLP (57) ABSTRACT

A system maps a user's interaction with a game controller to predefined hand positions that can be used in gaming and multimedia applications. A game controller with sensors receives user input with capacitive sensors and generates sensor outputs. A controller modeling module receives the sensor outputs and trains a model based on the outputs. The trained kinematic model maps the sensor outputs to one or more of a plurality of predefined hand positions. When an application requests the status of a user's hand position, e.g., through an API, the mapped hand position is sent to the application.

20 Claims, 6 Drawing Sheets

MAPPING USER INTERACTIONS WITH A CONTROLLER TO A HAND POSITION

CROSS-REFERENCE TO RELATED APPLICATIONS

This application claims the benefit of U.S. Provisional Application No. 62/092,719, filed Dec. 16, 2014, the entirety of which is incorporated by reference.

BACKGROUND

This invention relates generally to the field of game controllers, and more specifically, to mapping user interactions with an array of sensors on the controller to a set of hand positions.

Input devices such as game controllers allow users to interface with applications such as games and multimedia applications on a computing device. Controls on these input devices may include analog sticks, buttons, gyroscopes, and similar controls to identify user interactions with the controller.

However, these devices lack the accuracy and precision to be able to correctly detect a user's hand position on a controller and reproducibly map them to defined hand positions for use in an application. That is, these controllers generally cannot tell how a user is holding the controller, how many fingers are present on the controller, whether the user has one or more fingers off of the controller housing, and so forth. Different users will have different finger sizes, palm shapes, and patterns of orienting their hand for a particular hand position, which makes accurately detecting such hand positions difficult. Without input devices to accurately determine hand positions of a user, an application cannot incorporate the actual way that a user interacts with the controller into use of the application.

Recent developments and applications of virtual reality technology also contribute to the increased need for input devices with superior accuracy and precision in identifying user hand positions. For example, developers are increasingly creating non-gaming virtual reality applications such as medical training simulations. These medical simulations benefit from the input device being able to correctly track a trainee's intended interaction with virtual medical tools.

SUMMARY

A system maps a user's interaction with a game controller to a set of predefined hand positions such as open, closed, and partially open. The hand positions may include positions for specific fingers or digits of a hand. Thus, a user's interaction with the game controller can be recognized and identified as one or more of the hand positions. The mapped hand position may be used in various applications, such as gaming or multimedia applications.

The system comprises a game controller and a controller modeling module for processing and mapping outputs from the controller to a hand position. The outputs from the controller are mapped to a hand position using a computer model, such as a kinematic model. The kinematic model may be trained for a specific user based on hand positions provided by the user to the controller.

In one embodiment, the game controller comprises an array of sensors and a controller interface. The sensors are responsive to and sense the interaction of a user's hand with the game controller. The sensors may be positioned on the game controller in an area that is proximate to where the user's fingers would be placed. The sensors may be capacitive sensors that detect the change in capacitance near the sensor. The types of user interactions that the sensors may detect include motion, pressure, and position. For example, the sensors may register changes based on a user gripping the controller with all five fingers or that the user has pointed with an index finger. The sensors' ability to detect various types of user interaction facilitates a comprehensive set of measurements that improve accuracy and precision when mapping user interaction to hand positions. The sensor outputs are sent to a controller interface that transmits the set of sensor outputs to a controller modeling module that maps the sensor outputs to a hand position. The controller modeling module is executed by the controller itself or by a computing system, such as a game console or desktop computing device connected to the controller.

When the controller modeling module receives the sensor outputs, the controller modeling module applies a computer model that maps the received sensor inputs to one or more predefined hand positions. The controller modeling module may also train the computer model for a particular user. In training, a user is directed to perform certain hand positions, and sensor outputs are received as the user performs those hand positions. The directed hand positions and sensor inputs received for each hand position are used as training data to train the computer model.

The controller modeling module provides an application programming interface (API) for applications to retrieve hand positions. An application can transmit a request for the user's hand status through the API. Responsive to the request, mapped hand positions are sent by the controller modeling module to the requesting application. Applications can incorporate these hand positions into the functionality of the application. For example, in an educational video game, the application could interpret the predefined hand position of holding up an index finger as answering a math problem with the number "one." In another example, a game interprets a hand position with all fingers away from the controller as being an open hand and a hand position with all fingers against the controller as a closed hand, useful for picking up and dropping objects in the game.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
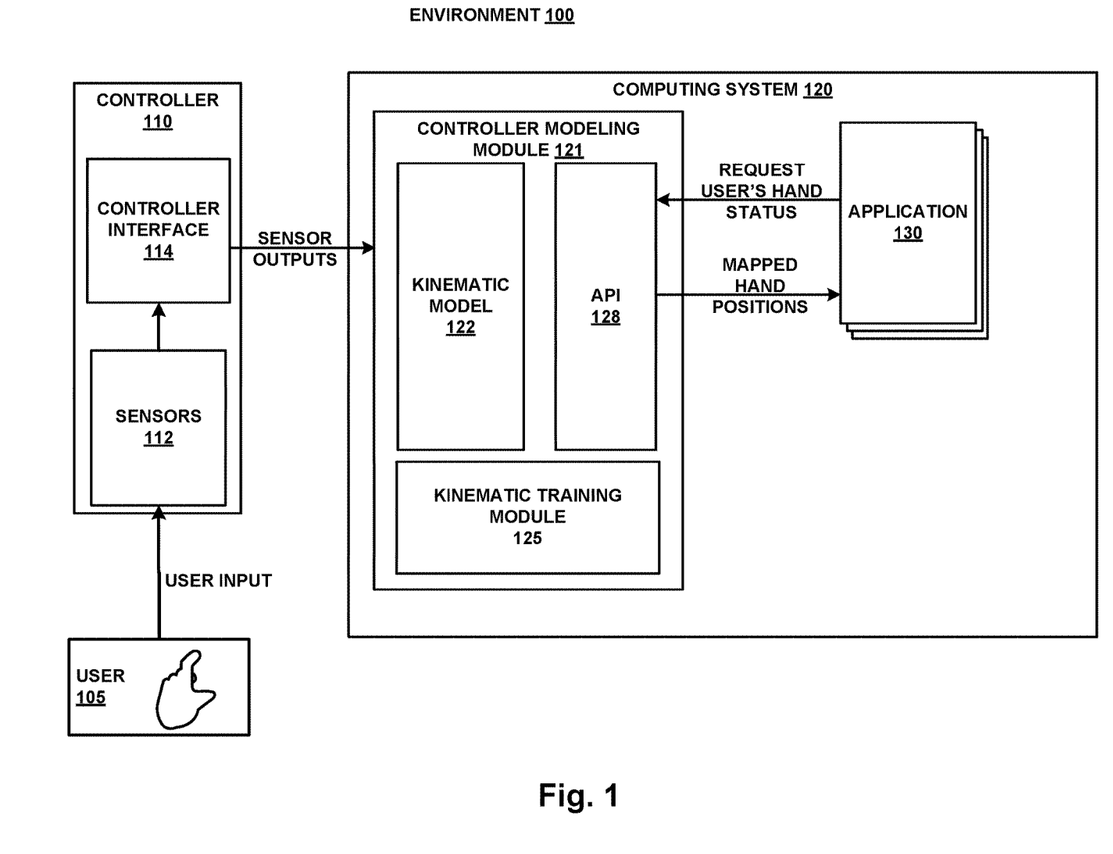
FIG. 1 is a high-level block diagram of an environment using mapped hand positions for a controller according to one embodiment.

FIG. 1 is a high-level block diagram of an environment 100 using mapped hand positions for a controller according to one embodiment. This example environment includes a controller 110 that receives user input from a user 105 on an array of sensors 112. The user input reflects how the user's hand interacts with the controller, such as the user's hand movements on the controller. As a user interacts with the controller, sensors 112 receive the user input and translate the input into sensor readings. These sensor readings are also termed sensor outputs. The controller 110 provides the sensor outputs to a computing system 120 that includes a controller modeling module 121 that processes the sensor outputs and maps the sensor outputs to predefined hand positions. Each predefined hand positions describe a particular arrangement of the hand or the individual components of the hand. The hand positions describe positions of the user's hand on the controller, such as "closed" "index finger up" etc. The hand positions are selected from a set of possible positions that may be interpreted by the controller modeling module 121. These hand positions are used by various applications 130 on the computing system 120, for example to control player movement in a game.

The controller 110 is a device for receiving user inputs, translating the inputs into sensor outputs, and transmitting sensor outputs to the computing system 120. The controller 110 is typically a hand-held device and includes further controls, buttons, gyroscopes, and so forth, that are not illustrated for clarity of description but may be included in various embodiments of the invention. The controller 110 includes sensors 112 that translate the user interactions with the controller into sensor reading outputs and a controller interface 114 that transmits the sensor outputs to the computing system 120. Sensors 112 are disposed proximate to the housing and sense interaction of the user 105 with different portions of the housing, permitting differentiated sensing of various hand movements made by the user 105. The controller interface 114 communicates with computing system 120 and sends sensor outputs to the computing system 120 and may receive control information from the computing system 120. The controller 110 may be physically connected to computing system 120, for example via a universal serial bus connection, or may be connected wirelessly, for example via a radio signal. The controller interface 114 uses the connection between the game controller 110 and the computing system 120 to send the sensor outputs received by the sensors 112 to the computing system 120.

The computing system 120 comprises a controller modeling module 121 and an application 130. The controller modeling module 121 receives the sensor outputs from the controller interface 114, and a kinematic training module 125 trains a kinematic model 122 based upon the sensor outputs. The kinematic model 122 maps the sensor outputs from the controller to predefined hand positions and provides the hand positions to applications 130. The hand positions may be sent by an application programming interface (API) to applications 130 that request a user's hand status through the API. Though described throughout as a kinematic model, other computer modeling methods may also be used to translate the sensor readings to a hand position.

Figure 2:
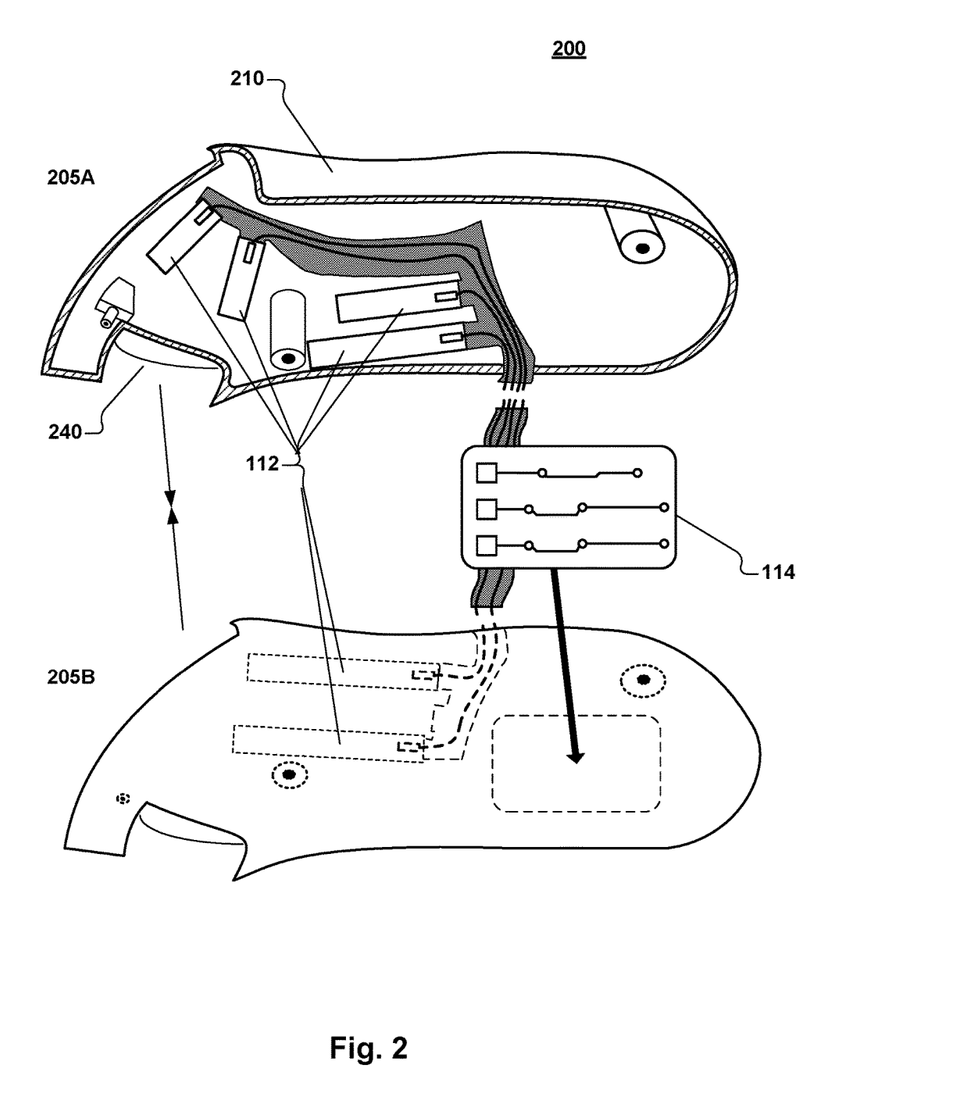
FIG. 2 illustrates a side-perspective sectional view of one embodiment of the controller.

FIG. 2 is a diagram illustrating a side-perspective sectional view 200 of one embodiment of the controller 110. In this example, two sides 205A, B, of the controller are shown. In the embodiment of FIG. 2, the controller's housing 210 contains sensors 112 that detect user input with the controller 110 and translates the input into sensor reading outputs. The housing 210 also contains the controller interface 114, which transmits the sensor outputs to the controller modeling module 121. In one embodiment, the sensors 112 are capacitive sensors, which generate electrical signals responsive to a capacitance that may be modified by a nearby human body. The sensors 112 may alternatively, or in combination, use other sensing technology such as resistive sensing or optical image sensing. Though shown in FIG. 2 as "strips," the sensors 112 may be located along the housing in a variety of ways, for example as a two-dimensional array of sensing elements. Each of these sensing elements is responsive to a change of capacitance at different portions of the housing 210.

The embodiment in FIG. 2 illustrates an array of sensors 112 constructed out of a flexible material. The flexibility of the material allows the array of sensors 112 to be associated with the controller 110 in a manner that fits the contour of the controller housing 210. Other embodiments of the controller use sensors 112 that are constructed from materials with varying characteristics. For example, flexible material may be used to construct sensors 112 positioned at the rounded areas of the housing 210, and rigid material may be used to construct sensors 112 positioned at the flat areas of the same housing 210.

The sensors 112 detect user input, which can be of different types. One type of user input that the sensors 112 may detect is the proximity of a user's hand or fingers are placed on the controller 110 near a sensor 112. For instance, if a user's index finger was placed along the right side of the controller 110, the sensor readings of a sensor 112 at that portion of the controller reflects a change responsive to the index finger placement. Additional sensors may also be included to detect additional characteristics of user interaction with the controller. For example, sensors may also be included that detect where the controller 110 is located in 3-D space, such as an accelerometer, gyroscope, infrared (IR) sensor, or camera. For example, the controller may include a sensor that detects the location of a known object in a room and determines an orientation of the controller with respect to that object.

Another type of user input that the sensors 112 may detect is the motion of the user's fingers, hand, or arm. The sensors 112 detect the movement of a user's fingers corresponding to certain touch gestures. For example, if a user uses their index finger to perform a rightwards swipe on the controller 110, the sensor readings would reflect that a finger started at a position on the controller and subsequently moved rightwards along the controller 110 in a continuous motion. Touch gestures are defined motions of the hand or fingers, such as a flick, swipe, pinch, or tap. The sensors could also different parameters relating to the user touching the housing 210, such as the number of times that a user tapped a location on the housing 210 within a certain time period. In addition to detecting finger motion, the controller may detect the motion of the controller 110 itself. The sensors 112 could include a gyroscope for measuring the orientation and rotation of the controller 110. For example, if a user emulates the turning of a doorknob by rotating the controller 110 along a particular axis, the gyroscope would detect that rotation.

Another type of user input that the sensors 112 may detect is the pressure a user applies to the controller 110. Pressure sensors detect the magnitude of pressure placed on the one or more sensors 112 by a user's hand or fingers. For example, if a user is squeezing the controller 110 in simulating the crinkling of a virtual piece of paper, the pressure sensors detect that the user is applying more pressure to the locations of the controller 110 that the user is squeezing.

Different embodiments may vary in the amount of user interaction information that is captured by the sensors 112. For example, the sensors 112 in one embodiment detect user input from the palm as well the individual digits of a user's hand. In other embodiments, the sensors 112 group parts of a user's hand together or detect a limited number of simultaneous touches on the controller housing 210.

The controller interface 114 receives the sensor reading outputs from the sensors and sends the outputs to the controller modeling module 121. The controller interface 114 may process the sensor readings before transmitting the outputs to the controller modeling module 121. Sensor reading processing can include, for example, normalizing the sensor data or filtering sensor noise. In one embodiment, the controller interface 114 interacts with the computing system 120 wirelessly, for example through Bluetooth. In another embodiment, the controller 110 and the computing system 120 are linked through a wired connection. The link between the controller 110 and the computing system 120 facilitates the transfer of data such as sensor outputs to be sent from the controller 110 to the computing system 120. The sensor readings may be sent continuously or periodically, and different types of sensor readings data may be sent in different time intervals.

The embodiment in FIG. 2 also illustrates a trigger mechanism 240 associated with the game controller 110. The optional trigger 240 mechanism provides an additional form of input that the user can use to interact with the controller 110. Other embodiments may use buttons or analog sticks in place of the trigger 240 or in combination with the trigger 240.

Figure 3:
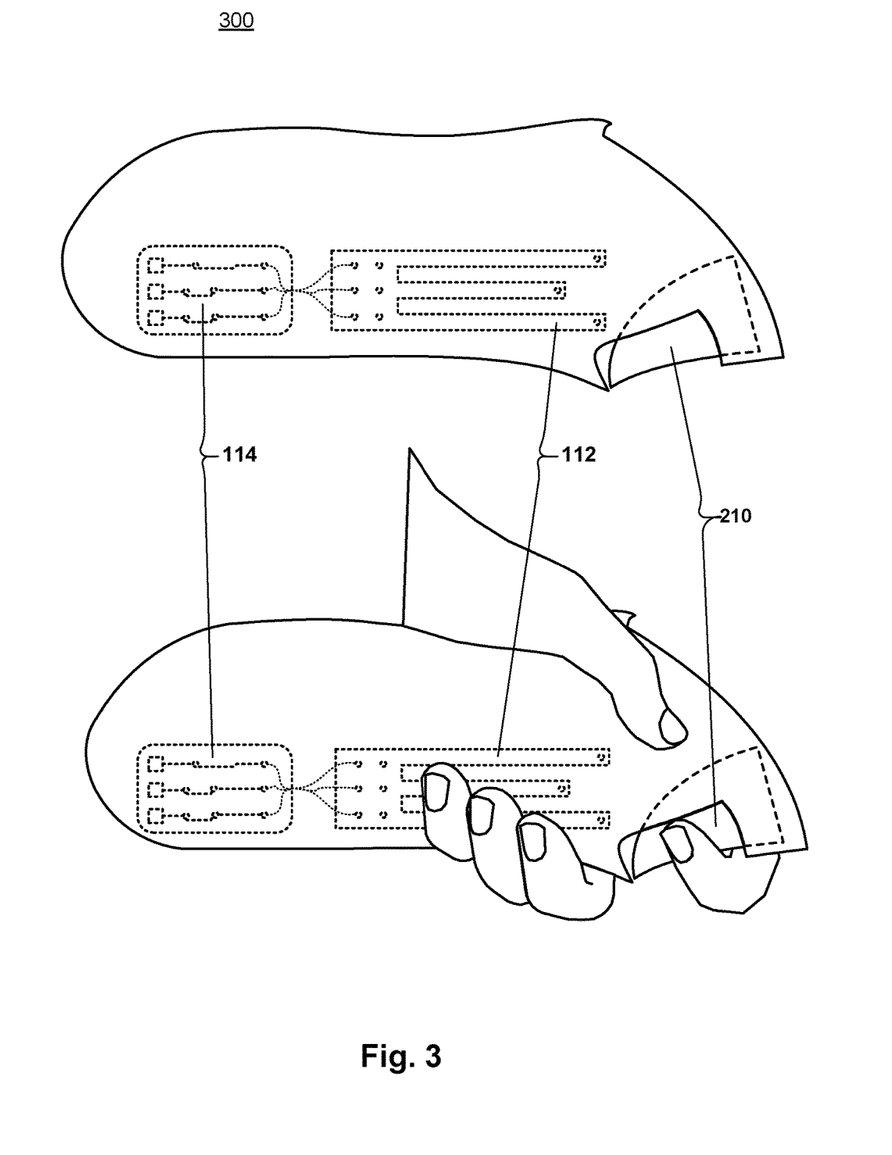
FIG. 3 illustrates a perspective view of one embodiment of the controller.

FIG. 3 is a diagram illustrating a perspective view 300 of one embodiment of the controller 110. In the embodiment of FIG. 3, the game controller 110 includes a trigger 240 mechanism and a housing 210. FIG. 3 illustrates a hand positioned on the controller 110 and its interactions sensors 112. The controller 110 may also include a strap to hold the controller 110 to the user's palm or other portion of the body during use. This permits a user to open the user's hand (e.g., all five fingers) during use without dropping the controller 110. In this configuration, the sensors 112 may still sense the presence of the user's palm proximate to the controller 110 to determine that the user's hand is open, but the controller is in use. The game controller housing 210 has various shapes and forms in various embodiments. For example, the housing 210 in one embodiment is suitable to be held with two hands. In such an embodiment, the array of sensors 112 detects user input from both hands, and the controller interface 114 transmits the corresponding sensor outputs to the controller modeling module 121 for subsequent mapping to one or more hand positions.

Returning to FIG. 1, the computing system 120 includes a controller modeling module 121 and an application 130. The controller modeling module 121 receives the sensor outputs from the controller 110, maps the sensor outputs to one or more hand positions, and provides the mapped hand position(s) to the application 130. The controller modeling module 121 includes various components, including a kinematic model 122, a kinematic training module 125, and an API 128. The kinematic model 122 maps the controller's sensor outputs to one or more hand positions. The kinematic model 122 may comprise, for example, forward and inverse kinematic equations, statistical models, and algorithms for mapping to hand positions. While a kinematic model is described herein, any suitable computer model may be used to translate the sensor outputs to a hand position identified for the user's interaction with the sensors 112.

The sensor outputs used by the kinematic model 122 may be the raw sensor readings from sensors 112 or may be processed by the controller 110 prior to receipt by the controller modeling module 121. Before applying the kinematic model, the computing system 120 may process the raw or pre-processed sensor outputs into a form more suitable for the kinematic model. Processing of the sensor outputs can include, for example, weighting the different types of sensor outputs or normalizing the sensor values.

The kinematic training module 125 trains the kinematic model 122 to map sensor outputs to hand positions. The training of the kinematic model 122 is described below with respect to FIG. 5. The trained kinematic model 122 maps the sensor outputs to one or more of a plurality of predefined hand positions.

An API 128 receives requests from an application 130 for a user's hand status and sends the mapped hand positions to the requesting application 130. The different types of applications 130 include, for example, video games, virtual simulators, multimedia applications, and development tools.

FIG. 1 illustrates a gaming environment 100 according to one particular embodiment, and the exact constituent elements and configuration of the gaming environment 100 vary in different embodiments. For example, although FIG. 1 depicts that the kinematic modeling is performed at a computing system 120 separate from the controller 110, the modeling may be performed at the controller 110. In this embodiment, the controller 110 contains the controller modeling module 121 that maps the sensor outputs to predefined hand positions. In this embodiment, the controller 110 provides the mapped hand positions to the computing system 120.

Figure 4:
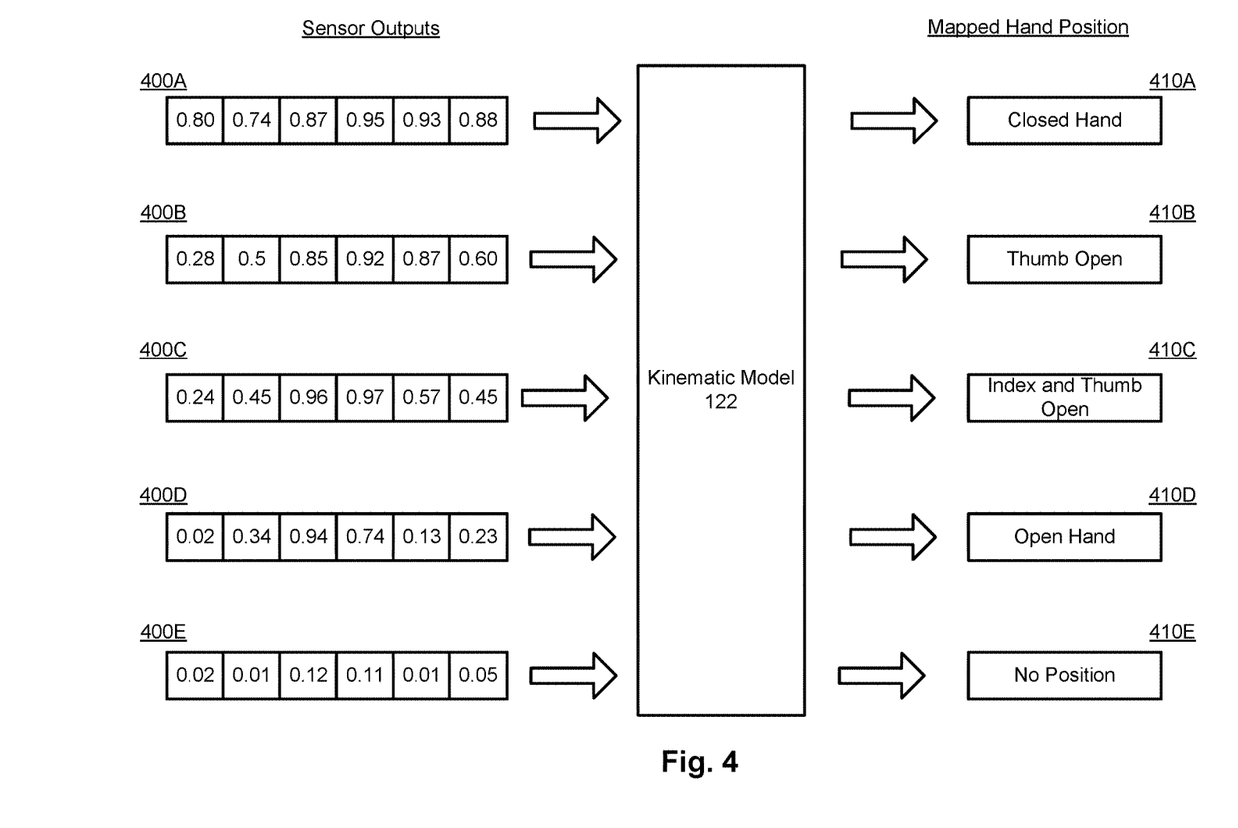
FIG. 4 shows an example illustration of mapping sensor outputs to a mapped hand position.

FIG. 4 shows an example illustration of mapping sensor outputs 400 to a mapped hand position 410. In this example, each set of sensor outputs 400A-E are represented as a vector of sensor readings. These sensor readings are applied to the kinematic model 122 to determine a mapped hand position 410A-410E corresponding to the user's hand position when interacting with the controller 110. In this example, the various sensor outputs 400 are generated at different points in time as the user interacts with the controller 110. The sensors 112 detect the various changes in the hand motions which are translated into differing sensor outputs 400. Accordingly, the kinematic model 122 maps the various sensor readings 400 into different mapped hand positions 410. In this example, sensor output 400A is mapped to a "closed hand" position, indicating a user's hand is fully wrapped around the controller 110, with thumb closed. Sensor output 400B is mapped to a "thumb open" position 410B, indicating the user is holding the controller 110 with the user's thumb off of the controller. Sensor output 400C is mapped to a "index and thumb open" position 410C, indicating that the user is holding the controller 110 with the user's palm on the controller and thumb and index finger off the controller. Sensor output 400D is mapped to an "open hand" position 410D, indicating the user is holding the controller 110 with an open hand. Finally, sensor output 400E is mapped to a "no position" position 410E, indicating that the sensor inputs are consistent with no use of the controller 110. Using these mapped hand positions, applications 130 readily identify and use various player hand movements on the controller 110 and incorporate such movements into the application functionality.

While these sensor readings 400 are shown with respect to individual points in time, the mapped hand positions may also identify hand positions based on changes of the sensor readings 400 over time. For example, such hand positions may include a tap, swipe, or grip on portions of the controller 110. These hand positions may be generated based on changes in the sensor readings, or a sequence of other hand positions. As another example, a transition from "thumb open" to "closed hand" to "thumb open" is identified as a "tap" motion by the thumb on the controller 110. The hand position identified by the kinetic model 122 may include the "tap" motion in addition to the "thumb open" position.

Figure 5:
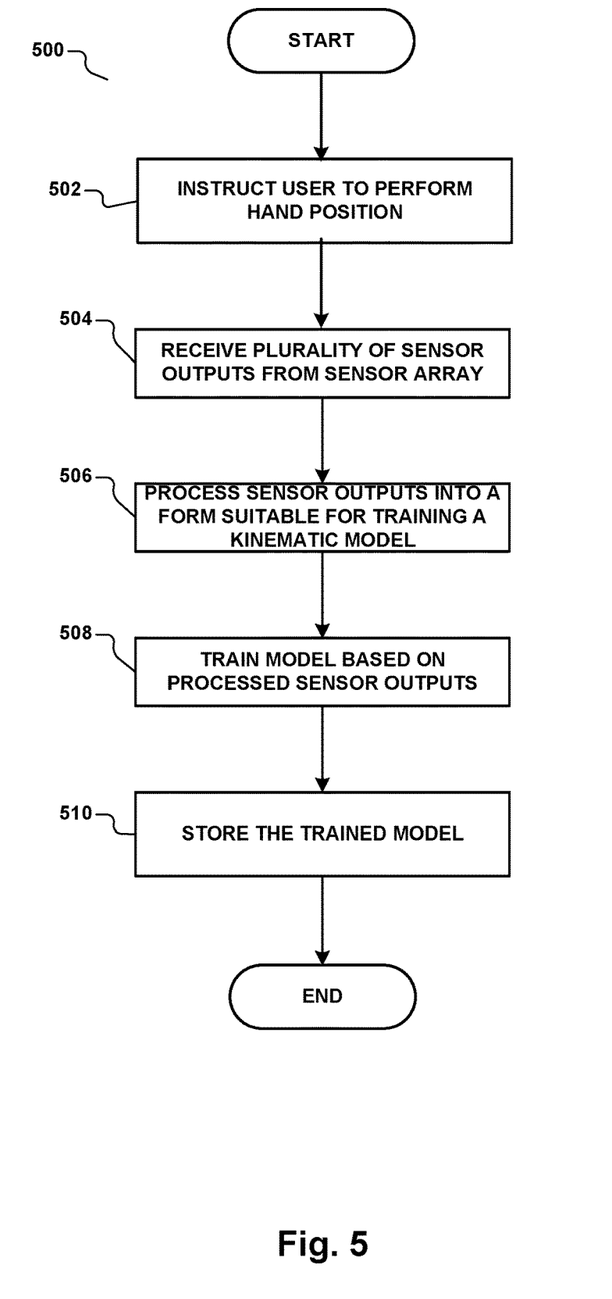
FIG. 5 shows an example flowchart illustrating steps performed by the controller modeling module when training the kinematic model to map sensor outputs to predefined hand positions.

FIG. 5 shows an example flowchart 500 illustrating steps performed by the controller modeling module 121 during the training of the kinematic model 122. To train the kinematic model 122, the controller modeling module 121 requests that the user perform some hand positions, and the controller modeling module 121 receives the sensor outputs generated by those hand positions. These sensor outputs are associated with the hand positions instructed for the user to perform and used to train a model to identify hand positions based on future sensor outputs.

Initially, the kinematic training module 125 instructs the user 502 to perform a hand position, such as a closed hand, a closed hand with a thumb up, or any other of the described hand positions. The user may be instructed to perform the hand position via a computer display, audio commands, and so forth. The controller modeling module 121 receives 504 a plurality of sensor outputs, for example from the controller interface 114 after the user has been instructed to perform the hand position. The received sensor outputs may be checked for edge conditions and indications that the user did not perform the requested hand position, for example by determining that one or more sensor readings are outside of a range acceptable for the requested hand position.

The sensor outputs received from the sensors may be processed 506 to normalize or weight the sensor output values. The sensor outputs may also be characterized into different categories depending on the corresponding type of user input. In one example, the kinematic model 122 in one embodiment receives sensor outputs corresponding to detected motion, location, or pressure. When the kinetic model 122 identifies that motion is more indicative of the user's hand status than pressure, then the sensor values corresponding to motion may be weighted more heavily. In another example, the kinetic model 122 simplifies the collection of raw sensor outputs in order to improve computing time. After processing the sensor outputs, the sensor outputs are associated with the hand position that the user was instructed 502 to perform.

These steps of instructing 502 a user to perform a hand position and receiving 504 sensor outputs after instructing the user may be performed several times to receive sensor outputs associated with various hand positions for the user.

In step 508, the kinematic training module uses the processed sensor outputs and associated hand positions to train the kinematic model 122. In one embodiment, the kinematic training module trains the model 122 by using the processed sensor outputs as coefficients or variables in one or more kinematic equations.

The kinematic model in one embodiment outputs values for mapping the sensor outputs to predefined hand positions. In one embodiment, the model 122 is initially programmed with established correspondences between predefined hand positions and specified kinematic model 122 output values. For example, the predefined hand position of a "thumbs-up" may be programmed to correspond to a profile of specified kinematic model output values. The sensor values received from instructing the user to perform a "thumbs-up" may be used to adjust the profile to better reflect the actual sensor readings of the user.

In another embodiment, a machine learning model is used to perform categorization of the sensor values into a hand position. This machine learning model may account for kinematic features of the sensor readings or may be trained only on the sensor readings and associated hand positions. In this embodiment, the computer model is trained as a classifier to identify the most-likely hand position for a set of sensor readings. The computer model may be trained using the sensor outputs received by instructing the user as a "ground truth" to establish known sensor outputs for known hand positions.

To determine a hand position for sensor readings of an unknown hand position, the kinematic model applies the kinematic model to compare each predefined hand position's profile of sensor values to the received sensor readings. The kinematic model can perform the comparison in different ways. For example, the model could use the cosine similarity metric to find the most similar profiles of kinematic model output values. In another example, the predefined hand positions are associated with profiles that contain ranges of kinematic model 122 values, and the user's profile is inspected for output values that fall within those ranges. Once the kinematic model finds a hand position profile that best matches the user's profile, the corresponding predefined hand position is assigned as the hand position for the user's hand position status. In another embodiment, each predefined hand position is programmed to correspond with an established set of raw sensor output values, and the raw sensor outputs are mapped directly to a predefined hand position.

The predefined hand positions may include, for example, static orientations and motion gestures. Examples of static orientations include a clenched first or the pointing of an index finger. Examples of motion gestures include a swinging motion for the arm or a pinching motion for the thumb and index fingers. Predefined hand positions may also correspond to particular functionality such as clicking a virtual button on the side of the controller 110.

The trained model is stored 510 as the kinematic model 122 in the controller modeling module 121.

The flowchart in FIG. 5 reflects one embodiment of training the kinematic model 122 and mapping sensor outputs to hand positions. In an alternative embodiment, the model 122 receives sensor outputs reflecting user interaction during a calibration phase. During the calibration phase, the kinematic training module 125 instructs a user 105 to interact with the game controller 110 to simulate one or more predefined hand positions. The kinematic training module 125 then uses the received sensor outputs to train the kinematic model 122 by associating the received sensor outputs with predefined hand positions. Different users will have different hand sizes and orientations on the sensors 112 with respect to certain hand positions or specified activities such as holding a pencil. One user may hold the pencil between their middle finger and ring finger, and another user may hold the pencil between their middle finger and index finger. The model 122 in this embodiment learns the distinctive user characteristics by first instructing a user to orient their hand as if holding a pencil, and then associating received sensor outputs with the predefined hand position of holding a pencil. Different techniques may be used to train the kinematic model 122 including for example, supervised classification techniques.

After the calibration phase of the alternative embodiment, the trained model 122 then receives sensor outputs from user interaction during the gameplay phase. Using the learned associations (trained model) from the calibration phase, the trained model 122 then maps the gameplay sensor outputs to predefined hand positions.

Figure 6:
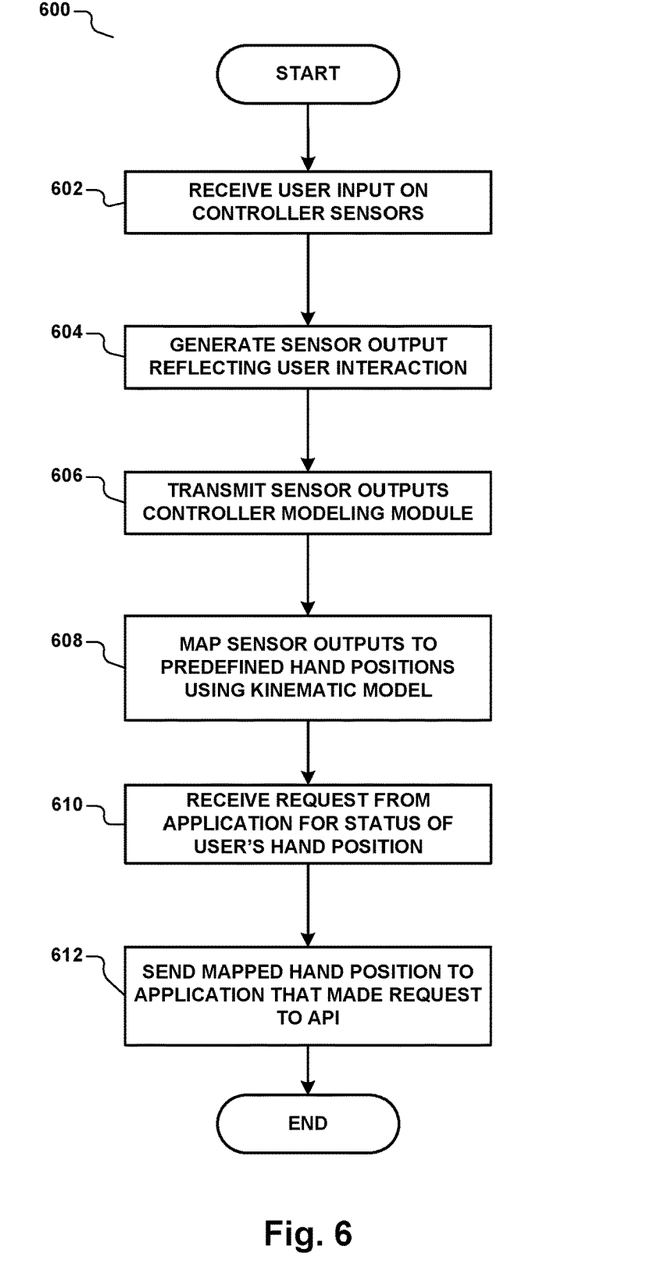
FIG. 6 shows an example flowchart illustrating the overall flow of data through the system of a particular embodiment.

FIG. 6 shows an example flowchart 600 illustrating the overall mapping of a sensor outputs to a hand position according to one embodiment. In step 602, the sensors 112 receive the user input stemming from the user's interaction with the controller 110. The sensors generate sensor outputs 604, and the controller interface 114 transmits the outputs to the controller modeling module 121. The controller interface 114 may process the sensor readings before transmitting the outputs. The controller modeling module 121 receives the sensor outputs, and the kinematic model 122 maps 608 the sensor outputs to predefined hand positions. The controller modeling module 121 optionally receives 610 a request for the hand position from an application 130. The mapped hand position is sent 612 to an application 130 that application 130 through an API 128.

CONCLUSION

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A game controller comprising:
    a housing adapted to a body part of a user;
    an array of sensors positioned in the housing configured to generate a set of outputs from the sensors based on a proximity of a body part of a user to each of the sensors; and
    a controller interface coupled to the array of sensors to receive the generated output therefrom, the controller interface configured to transmit data to a kinematic model that maps the sensor outputs from sensors to one or more hand positions of a plurality of hand positions, each of the plurality of hand positions describing a particular arrangement of the individual components of a user's hand, the one or more hand positions useable as a user input to control a software application, wherein the kinematic model is trained by generating coefficients of one or more kinematic equations based on the sensor outputs.

2. The game controller of claim 1, wherein at least one sensor of the one or more sensors detects the location of user interaction at the position of the at least one sensor.

3. The game controller of claim 1, wherein at least one sensor of the one or more sensors detects inertial changes to at least a portion of the housing.

4. The game controller of claim 1, wherein the sensor output for a sensor of the one or more sensors varies based on user-applied pressure at the position of the sensor.

5. The game controller of claim 1, wherein the one or more arrays of one or more sensors are constructed with flexible materials.

6. The game controller of claim 1, wherein the array of sensors are positioned on a surface of the housing, within the surface of the housing, or below the surface of the housing.

7. A computer program product comprising a non-transitory computer-readable storage medium containing program code that when executed by a processor causes the processor to perform steps:
    instructing a user to simulate one or more of a plurality of predefined hand positions by interacting with a game controller during the training phase, each of the predefined hand positions describing a particular arrangement of the individual components of the hand;
    receiving patterns of one or more sensor outputs during the training phase from one or more sensors of the game controller, the one or more sensors configured to sense user interaction with portions of the game controller;

associating the received patterns of sensor outputs to the one or more of a plurality of predefined hand positions; and training a kinematic model based on the associations between the received patterns of sensor outputs and the one or more of a plurality of hand positions, wherein the kinematic model is trained by generating coefficients of one or more kinematic equations based on the sensor outputs.

8. The computer program product of claim 7, wherein the steps further comprise:

receiving patterns of one or more sensor outputs during gameplay from one or more sensors on the game controller;

mapping the received patterns of sensor outputs during gameplay to one or more of a plurality of hand positions using the trained kinematic model; and sending the mapped one or more hand positions to an application on a computing device.

9. The computer program product of claim 7, wherein the plurality of predefined hand positions include one or more hand or finger motions.

10. The computer program product of claim 7, wherein the plurality of predefined hand positions include hand positions indicating positioning of individual digits of a hand.

11. The computer program product of claim 7, wherein at least one sensor of the one or more sensors detects the location of user interaction at the position of the sensor.

12. The computer program product of claim 7, wherein at least one sensor of the one or more sensors detects inertial changes to at least a portion of the housing.

13. The computer program product of claim 7, wherein the sensor output for a sensor of the one or more sensors varies based on user-applied pressure at the position of the sensor.

14. A method comprising:

instructing a user to simulate one or more of a plurality of predefined hand positions by interacting with a game controller during the training phase, each of the predefined hand positions describing a particular arrangement of the individual components of the hand;

receiving patterns of one or more sensor outputs during the training phase from one or more sensors of the game controller, the one or more sensors configured to sense user interaction with portions of the game controller;

associating the received patterns of sensor outputs to the one or more of a plurality of predefined hand positions; and training a kinematic model based on the associations between the received patterns of sensor outputs and the one or more of a plurality of hand positions, wherein training the kinematic model comprises:

generating coefficients of one or more kinematic equations based on the received patterns of sensor outputs.

15. The method of claim 14, wherein the steps further comprise:

receiving patterns of one or more sensor outputs during gameplay from one or more sensors on the game controller;

mapping the received patterns of sensor outputs during gameplay to one or more of a plurality of hand positions using the trained kinematic model; and sending the mapped one or more hand positions to an application on a computing device.

16. The method of claim 14, wherein the plurality of predefined hand positions include one or more hand or finger motions.

17. The method of claim 14, wherein the plurality of predefined hand positions include hand positions indicating positioning of individual digits of a hand.

18. The method of claim 14, wherein at least one sensor of the one or more sensors detects the location of user interaction at the position of the sensor.

19. The method of claim 14, wherein at least one sensor of the one or more sensors detects inertial changes to at least a portion of the housing.

20. The method of claim 14, wherein the sensor output for a sensor of the one or more sensors varies based on user-applied pressure at the position of the sensor.

* * * * *

UNITED STATES PATENT AND TRADEMARK OFFICE
CERTIFICATE OF CORRECTION

PATENT NO.         : 10,065,111 B1
APPLICATION NO.    : 14/971038
DATED              : September 4, 2018
INVENTOR(S)        : Patel et al.

It is certified that error appears in the above-identified patent and that said Letters Patent is hereby corrected as shown below:

In the Claims

Column 10, Line 40, Claim 2: "the location" to read as -- a location --
Column 10, Line 60, Claim 7: "during the training phase," to read as -- during a training phase, --
Column 11, Line 2, Claim 7: "a plurality of predefined hand positions;" to read as -- the plurality of predefined hand positions; --
Column 11, Line 6, Claim 7: "a plurality of hand positions;" to read as -- the plurality of predefined hand positions; --
Column 11, Line 16-17, Claim 8: "a plurality of hand positions;" to read as -- the plurality of predefined hand positions; --
Column 11, Line 28-29, Claim 11: "the location of user" to read as -- a location of user --
Column 11, Line 40, Claim 14: "during the training phase," to read as -- during a training phase, --
Column 12, Line 7, Claim 14: "a plurality of predefined hand positions;" to read as -- the plurality of predefined hand positions; --
Column 12, Line 11, Claim 14: "a plurality of hand positions;" to read as -- the plurality of predefined hand positions; --
Column 12, Line 23-24, Claim 15: "a plurality of hand positions" to read as -- the plurality of predefined hand positions --
Column 12, Line 34, Claim 18: "the location" to read as -- a location --

Signed and Sealed this
Fifth Day of November, 2019

Andrei Iancu
*Director of the United States Patent and Trademark Office*